United States Patent
Dancu et al.

(10) Patent No.: US 7,063,942 B2
(45) Date of Patent: Jun. 20, 2006

(54) SYSTEM AND METHOD TO SIMULATE HEMODYNAMICS

(75) Inventors: Michael B. Dancu, Ringwood, NJ (US); John M. Tarbell, State College, PA (US)

(73) Assignee: Victor Krstec, Wayne, NJ (US)

( * ) Notice: Subject to any disclaimer, the term of this patent is extended or adjusted under 35 U.S.C. 154(b) by 484 days.

(21) Appl. No.: 09/973,433

(22) Filed: Oct. 9, 2001

(65) Prior Publication Data

US 2002/0042701 A1 Apr. 11, 2002

Related U.S. Application Data

(60) Provisional application No. 60/239,015, filed on Oct. 6, 2000.

(51) Int. Cl.
*A01N 1/00* (2006.01)
(52) U.S. Cl. .............. 435/1.1; 435/1.2; 435/284.1; 435/286.5; 435/307.1; 623/916; 623/917; 623/921; 73/37; 73/168; 73/866.4
(58) Field of Classification Search .......... 435/284.1, 435/286.5, 293.1, 307.1, 1.1, 1.2; 623/1.41, 623/916, 917, 921; 73/37, 168, 866.4
See application file for complete search history.

(56) References Cited

U.S. PATENT DOCUMENTS

| | | | | | |
|---|---|---|---|---|---|
| 5,272,909 | A | * | 12/1993 | Nguyen et al. | 73/37 |
| 5,376,110 | A | * | 12/1994 | Tu et al. | 600/36 |
| 5,537,335 | A | * | 7/1996 | Antaki et al. | 702/100 |
| 5,792,603 | A | * | 8/1998 | Dunkelman et al. | 435/1.2 |
| 5,846,828 | A | * | 12/1998 | Peterson et al. | 435/399 |
| 5,916,800 | A | * | 6/1999 | Elizondo et al. | 435/284.1 |
| 6,174,719 | B1 | * | 1/2001 | Elizondo et al. | 435/284.1 |
| 6,205,871 | B1 | * | 3/2001 | Saloner et al. | 73/866.4 |
| 6,416,995 | B1 | * | 7/2002 | Wolfinbarger | 435/289.1 |

* cited by examiner

*Primary Examiner*—David Redding
(74) *Attorney, Agent, or Firm*—Fleshner & Kim, LLP

(57) ABSTRACT

A system for hemodynamic simulation comprises a vessel having properties of a blood vessel, a reservoir containing a quantity of fluid, tubing connecting the vessel and reservoir, and at least one pump for circulating the fluid within the system. Fluid can be tissue culture medium or blood analog fluid, and the vessel may include mammalian cells attached to its inside. A drive system, comprising two reciprocating drive shafts that are coupled by a cam, enables the uncoupling of pulsatile flow and pulsatile pressure to provide independent control over wall shear stress and circumferential strain. The shaft drives two pumps that are 180 degrees out-of-phase and are connected upstream and downstream of the vessel, and effect this uncoupling.

46 Claims, 10 Drawing Sheets

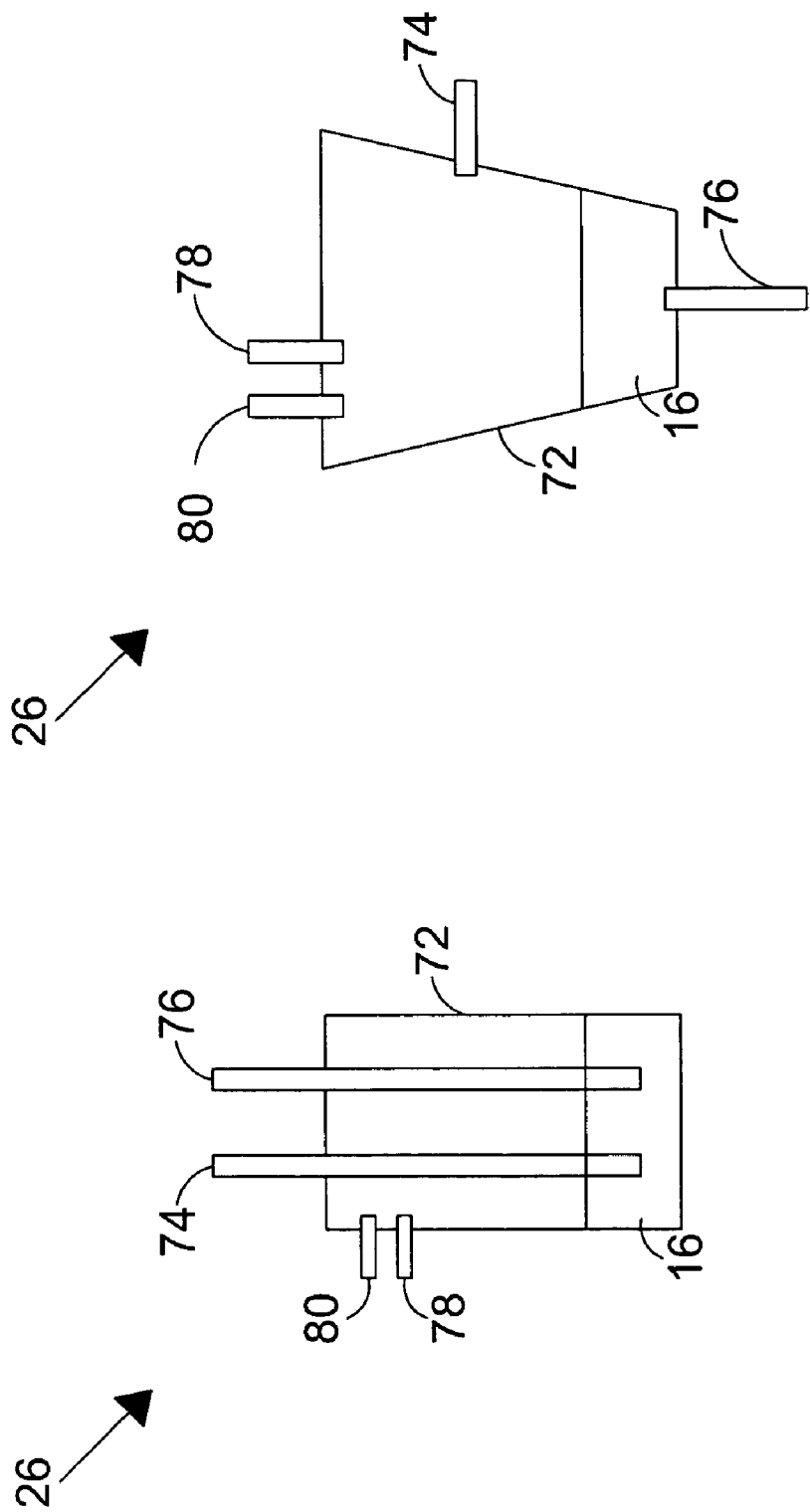

SYSTEM AND METHOD TO SIMULATE HEMODYNAMICS

CROSS-REFERENCE TO RELATED APPLICATIONS

This application claims the benefit, under 35 U.S.C. §119(e), of U.S. Provisional Application No. 60/239,015, filed Oct. 6, 2000 by the applicant, and which is herein incorporated by reference in its entirety.

STATEMENT REGARDING FEDERALLY SPONSORED RESEARCH OR DEVELOPMENT

The work described in this application was supported by funding from the National Institutes of Health under Grant No. HL-35549. The United States Government may have certain rights to the invention.

FIELD OF THE INVENTION

The present invention is a system and method for simulating the hemodynamic patterns of physiologic blood flow. In particular, the present invention can simultaneously generate wall shear stress and circumferential strain patterns relevant to cardiovascular function and disease.

BACKGROUND OF THE INVENTION

Cardiovascular disease is the leading cause of death in the United States, and costs millions of dollars per year. Atherosclerosis is the leading cause of death in the developed world and nearly the leading cause in the developing world. Atherosclerosis is a disorder in which the coronary arteries become clogged by the build up of plaque along the interior walls of the arteries, leading to decreased blood flow which can in turn cause hypertension, ischemias, strokes and, potentially, death.

Atherosclerosis has been shown to occur in sites of complex hemodynamic behavior. Surgical intervention is often employed to treat it, and may include insertion of a balloon catheter to clean out the plaque, and insertion of a stent within the vessel to enable it to remain open, or may include multiple bypasses of the clogged vessels. Bypass surgery involves the removal of a section of vein from the patient's lower leg, and its transplant into the appropriate cardiac blood vessels so that blood flows through the transplanted vein and thus bypasses the clogged vessels.

A major problem associated with bypass surgery is the patency of the vessels to be used in the bypass. The bypass vessels are prone to failure, which may occur within a short period of time after bypass surgery, or after a period of several years. Hemodynamic forces have been implicated as a major factor contributing to the failure of the bypass vessels.

Hemodynamic forces (i.e., forces due to blood flow) are known to influence blood vessel structure and pathology. The vascular cells lining all blood vessels are endothelial cells, which are important sensors and transducers of the two major hemodynamic forces to which they are exposed: wall shear stress ("WSS"), which is the fluid frictional force per unit of surface area, and hoop stress, which is driven by the circumferential strain ("CS") of pressure changes. Wall shear stress acts along the blood vessel's longitudinal axis. Circumferential strain is associated with the deformation of the elastic artery wall (i.e., changes in the diameter of the vessel) in response to the pulse of vascular pressure. Wave reflections in the circulation and the inertial effects of blood flow cause a phase difference, the stress phase angle ("SPA"), between CS and WSS. The SPA varies significantly throughout the circulation, and is most negative in disease prone locations, such as the outer walls of a blood vessel bifurcation. Hemodynamic forces have been shown to dramatically alter endothelial cell function and phenotype (i.e., high shear stress [low SPA] is associated with an atheroprotective gene expression profile, and a low shear stress [large SPA] is associated with an atherogenic gene expression profile). There is thus a great need to study vascular biology in a complete, integrative, and controlled hemodynamic environment.

Despite the significance of hemodynamic WSS and CS acting on the vessel wall, especially at regions of the circulation with a high risk of localization of cardiovascular diseases, detailed knowledge of the combined influence of the time varying patterns of WSS and CS on endothelial cell biological response has remained technologically unfeasible.

Laboratory studies of vascular fluid mechanics have demonstrated that wall shear stress (WSS) and circumferential strain (CS) are out of phase temporally, and that there is a systematic variation of the stress phase angle (SPA) throughout the circulation. This variation is highly out-of-phase in the large arteries, where arterial disease generally occurs, while in the smaller vessels and veins where disease is rare, this variation is generally in phase.

Where an artery bifurcates, Spa varies with the local spatial position within that bifurcation, the more out-of-phase environment being localized on the outer wall of the bifurcation where atherosclerosis occurs. SPA was found to be more out-of-phase in the coronary arteries than at any other location in the circulation.

Prior technology has focused on the individual effects of WSS or CS, individually, on endothelial cells. Berthiaume and Frangos described a device that simulates wall shear stress using a rod and plate system that is similar to the cone and plate system used in viscometers. Chang described a parallel flow chamber used to simulate steady flow. Carosi et al and Sumpio et al. describe devices to simulate cyclic strain that consists of a flexible membrane that is stretched by a motor or a vacuum suction system.

Qiu and Tarbell described a device to simulate pressure and flow in tubes, but the device did not permit using a wide range of phase angles (SPAs), and was technically difficult to use. Limitations, however, of the Qiu and Tarbell system included having the maximum attainable phase angle being 100 degrees, the amplitude and phase of the flow and pressure are coupled, and the system utilized large quantities of fluid. The present invention, by its selection of tubing and vessel diameters, in contrast, employs approximately one fifth the volume of fluid as that system. Seliktar et al. in an in vitro study, verified that simulation of the hemodynamic environment is critical to vessel patency and function.

The patent literature described several systems for examining the effects of strain, or the effects of shear, individually, on cells or blood vessels.

Seliktar et al. (U.S. Pat. No. 5,928,945) describes a bioreactor for producing cartilage in vitro, comprising a growth chamber, a substrate on which chondrocyte cells or chondrocyte stem cells are attached, and means for applying relative movement between a liquid culture medium and the substrate to provide a shear flow stress to the cells attached to the substrate.

In U.S. Pat. No. 5,899,937 Goldstein et al. describe a closed, sterile pulsatile loop for studying tissue valves. The system provides a tool to examine heart valve leaflet fibroblast function and differentiation as these are affected by mechanical loading, as well as an apparatus to provide heart valves seeded with suitable cells. The sterile pulsatile flow system which exposes viable tissue valves to a dynamic flow environment imitating that of the aortic valve.

Wolf et al. (U.S. Pat. No. 5,271,898) discloses an apparatus for testing blood/biomaterials/device interactions and characteristics, comprising a stepper-motor driven circular disc upon which a test vehicle is mounted. The test vehicle comprises a circular, closed loop of polymer tubing containing a check valve, and contains either the test materials, coating, or device. The apparatus generates pulsatile movement of the test vehicle. Oscillation of the test vehicle results in the pulsatile movement of fluid over its surface.

In U.S. Pat. No. 6,205,871 B1 Saloner et al disclose a panel of anatomically accurate vascular phantoms comprising a range of stenotic conditions varying from normal to critically stenosed (0% area reduction to greater than 99% reduction), and which phantoms are subjected to pulsatile flow of a blood mimic fluid.

Vilendrer (U.S. Pat. No. 5,670,708) discloses a device for measuring compliance conditions of a prosthesis under simulated physiologic loading conditions. The prosthesis includes stents, grafts and stent-grafts, which is positioned within a fluid conduit of the apparatus, wherein the fluid conduit is filled with a saline solution or other fluid approximating the physiological condition to be tested. The fluids are forced through the fluid conduit from both ends of the conduit in a pulsating fashion at a high frequency simulating systolic and diastolic pressures.

In U.S. Pat. No. 4,839,280 Banes describes an apparatus for applying stress to cell cultures, comprising at least one cell culture plate having one or more wells thereon, with each of the wells having a substantially planar base formed at least partially of an elastomeric membrane made of biocompatible polyorganosiloxane composition, with the elastomeric membrane having an upper surface treated to permit cell growth and attachment thereto by means of the incorporation at the upper surface of a substance selected from the group consisting of an amine, a carboxylic acid, or elemental carbon, and vacuum means for controlling the elastomeric membrane to the pulling force of a vacuum. Banes (U.S. Pat. No. 6,218,178 B1) discloses an improvement, in the form of a loading station assembly for allowing stretching of a flexible cell culture membrane, the assembly comprising a planar member and a post extending from a surface of the planar member, an upper surface of the post being configured to support a flexible cell culture membrane, the planar member defining a passageway configured to allow fluid to flow through from one side of the planar member to an opposite side of the planar member, and wherein the flexible cell culture member is stretchable at a periphery of the upper surface towards the planar member.

In U.S. Pat. Nos. 4,940,853 and 5,153,136 Vanderburgh describes a method and apparatus for growing tissue culture specimens in vitro, respectively. The apparatus comprises an expandable membrane for receiving a tissue specimen thereon, a mechanism for expanding the membrane and the tissue specimen, and a controller for controlling the expanding mechanism. The controller is operative for applying an activity pattern to the membrane and a tissue specimen thereon which includes simultaneous continuous stretch activity and repetitive stretch and release activity. The continuous stretch and release activity simulate the types of activity to which cells are exposed in vivo due to growth and movement, respectively, and they cause the cells of tissue specimens grown in the apparatus to develop as three-dimensional structures similar to those grown in vivo.

In U.S. Pat. Nos. 5,217,899 and 5,348,879 Shapiro et al. describe an apparatus and method for stretching cells in vitro, respectively. The inventions impart to a living culture of cells biaxial mechanical forces which approximate the mechanical forces to which cells are subjected in vivo. The apparatus includes a displacement applicator which may be actuated to contact and stretch a membrane having a living cell culture mounted thereon. Stretching of the membrane imparts biaxial mechanical forces to the cells. These forces may be uniformly applied to the cells, or they may be selectively non-uniformly applied.

Lee et al. (U.S. Pat. No. 6,057,150) discloses a biaxial strain system for cultured cells that includes a support with an opening over which an elastic membrane is secured, a moveable cylinder coaxial with the opening and fitting closely but movably within the opening, and an actuating member that stabilizes and controls the position of the cylinder relative to the opening. The actuating member is coupled to the support by a threaded connection while engaging the movable cylinder. The degree of membrane stretch is accurately controlled by the rotation of the actuating member.

In U.S. Pat. No. 4,851,354 Winston et al. disclose an apparatus for mechanically stimulating cells, comprising an airtight well having an optically transparent compliant base of a biologically compatible material on which the cells may be grown and an optically transparent, removable cap, coupled with a ported, airtight reservoir which reservoir has an optically transparent base and which reservoir can be filled with pressuring media to create cyclic variations in hydrostatic pressure beneath the complaint base, causing the compliant base to deform and thereby exert a substantially uniform biaxial force on the cells attached thereto.

Lintilhac et al. (U.S. Pat. No. 5,406,853) disclose an instrument for the application of controlled mechanical loads to tissues in sterile culture. A slider which contacts the test subject is in force transmitting relation to a forcing frame. Tension, compressive and bending forces can be applied to the test subject, and force applied to the test subject is measured and controlled. A dimensional characteristic of the test subject, such as growth, is measured by a linear variable differential transformer. The growth measurement data can be used to control the force applied. Substantially biaxial stretching is achieved by placing the test subject on an elastic membrane stretched by an arrangement of members securing the elastic member to the forcing frame.

In U.S. Pat. No. 6,107,081 Feeback et al. disclose a unidirectional cell stretching device capable of mimicking linear tissue loading profiles, comprising a tissue culture vessel, an actuator assembly having a relatively fixed structure and an axially transformable ram within the vessel, at least one elastic strip which is coated with an extracellular matrix, and a driving means for axially translating the ram relative to the relatively fixed structure, and for axially translating the end portion of the elastic strap affixed to the ram relative to another, opposite end portion, for longitudinally stretching the elastic strap.

Nguyen et al. (U.S. Pat. No. 5,272,909) disclose a method and device for testing venous valves in vitro. The device comprises (a) a fixture for mounting a sample valve on a liquid flow path. (b) a muscle pump component and/or (c) respiratory pump component and/or (d) capacitance reservoir component and/or (e) vertical hydrostatic column component, all of the components being fluidly connected to the flow path to mimic the muscle pump, respiratory pump, capacitance and hydrostatic impedance effects of actual in situ venous circulation in the mammalian body. The muscle pump is designed to mimic effects caused by movement of the visceral organs and somatic muscles on a vein, while the respiratory pump is designed mimic the effects of normal cyclic variations in the intra-thoracic pressure due to the movement of the thoracic muscles and diaphragm. The combination of pumps of the present invention provides a means to examine the effects of pulsatile pressure, wall shear stress, and circumferential strain, separately or in combination, on blood vessels or mammalian cells in vitro.

In U.S. Pat. No. 5,537,335 Antaki et al. disclose a fluid delivery apparatus in which a predetermined pressure waveform is introduced into a conduit, such as a human saphenous vein. By such exposure, the vein can be "arterialized", meaning that it can be conditioned in preparation for its use in bypass surgery, an excised vein according to the inventors. The combination of pumps and the manner of controlling the degree of their being in phase or out-of-phase with each other provides a means to examine not only the effects of a blood pressure waveform, but also the effects of pulsatile pressure, wall shear stress, and circumferential strain, separately or in combination, on blood vessels or mammalian cells in vitro.

The most common WSS simulating systems utilize a 2-dimensional stiff surface, such as a glass slide, for the endothelial cell culture forming the wall of a parallel plate flow chamber. The WSS in these devices is usually steady because of difficulties in simulating pulsatile flow. Cyclic straining devices provide only strain, by stretching cells on a compliant membrane without flow. Both types of systems are thus limited by their design. However, no studies have been performed studying both parameters (WSS and CS) using cells grown on a single type of support surface because such a system, until now, has remained technologically unfeasible. The present invention addresses and solves this long-felt need by providing a system in which endothelial cells can be grown on a single support surface, and subjected to studies in which both wall shear stress and circumferential strain can be examined independently of each other.

The use of a silicone tube coated with endothelial cells was recently introduced, and provided the potential for simultaneous coupled pulsatile strain and shear stress. However, these tubes were used in flow simulators coupling pressure and flow that could only achieve phase angles (SPAs) of about 90–100 degrees; such a phase angle was inadequate for simulating coronary arteries, the most disease prone vessels in the circulation, because coronary arteries are characterized by a high SPA, on the order of approximately 250 degrees. These flow simulators were difficult to use and to produce replicable reliable results. The present invention overcomes this problem, by providing time-varying uniform cyclic pressure (and consequently CS) and pulsatile flow (and consequently WSS) in a 3-dimensional configuration over a complete range of SPAs, as a most complete physiologic environment.

BRIEF SUMMARY OF THE INVENTION

It is an object of the present invention to provide a system to simulate physiological hemodynamics.

Another object of the present invention to provide a system to simulate biomechanical stimuli due to fluid flow, pressure and pressure differentials (transmural pressure).

Another object of the present invention is to provide a system in which the effects of wall shear stress ("WSS") and circumferential strain ("CS") can be studied independently of each other.

Another object of the present invention is to provide a system in which the effects of wall shear stress ("WSS") and circumferential strain ("CS") can be studied simultaneously.

Another object of the present invention is to provide a system in which the effects of wall shear stress ("WSS") and circumferential strain ("CS") can be studied independently of each other over a wide range of stress phase angles ("SPA").

Another object of the present invention is to provide a system in which the effects of vasoactive compounds can be studied.

Another object of the present invention is to provide a system in which effects of vasoactive compounds can be studied on the genes that regulate their production.

It is an object of the present invention to provide a system to simulate physiological hemodynamics of a plurality of blood vessels.

It is an object of the present invention to provide a system to simulate physiological hemodynamics of a plurality of mammalian blood vessels.

It is an object of the present invention to provide a system to simulate physiological hemodynamics of a plurality of human blood vessels.

It is an object of the present invention to provide a method for to simulating physiological hemodynamics.

Another object of the present invention to provide a method of simulating biomechanical stimuli due to fluid flow, pressure and pressure differentials (transmural pressure).

Another object of the present invention is to provide a method for studying effects of wall shear stress ("WSS") and circumferential strain ("CS") independently of each other.

Another object of the present invention is to provide a method for the simultaneous study of the effects of wall shear stress ("WSS") and circumferential strain ("CS") on vessels.

Another object of the present invention is to provide a method for the independent study of the effects of wall shear stress ("WSS") and circumferential strain ("CS") over a wide range of stress phase angles ("SPA").

Another object of the present invention is to provide a method for studying the effects of vasoactive compounds.

Another object of the present invention is to provide a method for studying the effects of vasoactive compounds on the genes that regulate their production.

It is an object of the present invention to provide a method for simulating physiological hemodynamics of a plurality of blood vessels.

It is an object of the present invention to provide a method for simulating physiological hemodynamics of a plurality of mammalian blood vessels.

It is an object of the present invention to provide a method for simulating physiological hemodynamics of a plurality of human blood vessels.

The present invention achieves the uncoupling of pulsatile flow and pulsatile pressure to provide independent control over WSS and CS. The system at first seems paradoxical since it is classically well known that pressure and flow are coupled. However, in a dynamic sinusoidal environment, such as that of the present invention, flow and pressure can be independently modulated and therefore, appear to be uncoupled. The drive system, comprising two reciprocating drive shafts that are coupled via a circular cam effects this uncoupling. The flow shaft drives pumps, that are at opposite ends, that are 180 degrees out-of-phase and are connected to the recirculating flow loop upstream and downstream of the test section (compliant vessel). The flow shaft allows independent control of pulsatile flow with no pulsatile circumferential strain. The second (pressure) shaft also drives two piston pumps that are 180 degrees out-of-phase; however, one piston drives the internal pressure upstream to the test section and the other piston drives the external chamber pressure. The pressure shaft allows for independent control of the pulsatile pressure. The attachment points of the circular cam that couples the two drive shafts can be adjusted to provide the phase (between 0 and 360 degrees) between the motions of the two shafts. This phase difference provides simulation of a wide range of SPAs, including the disease prone coronary arteries (approximately 250 degrees). Since the flow is related to wall shear stress (WSS) and the pressure is related to the circumferential strain (CS), the pulsatile WSS and pulsatile CS are independent and uncoupled.

The present invention is a system for hemodynamic simulation comprising a vessel having properties of a blood vessel, a reservoir containing a quantity of fluid, tubing connecting the vessel and reservoir, and at least one pump for circulating the fluid within the system. Fluid can be tissue culture medium or blood analog fluid, and the vessel may include mammalian cells attached to its inside. A drive system, comprising two reciprocating drive shafts that are coupled by a cam, enables the uncoupling of pulsatile flow and pulsatile pressure to provide independent control over wall shear stress and circumferential strain. The shaft drives two pumps that are 180 degrees out-of-phase and are connected upstream and downstream of the vessel, and effect this uncoupling.

Panel A: using a linear shaped support rod;
Panel B: using a tapered support rod.

FIG. 9a and b illustrates another embodiment of the noise filter (vibration damper). Panels A and B represent two different configurations.

Figure 10:
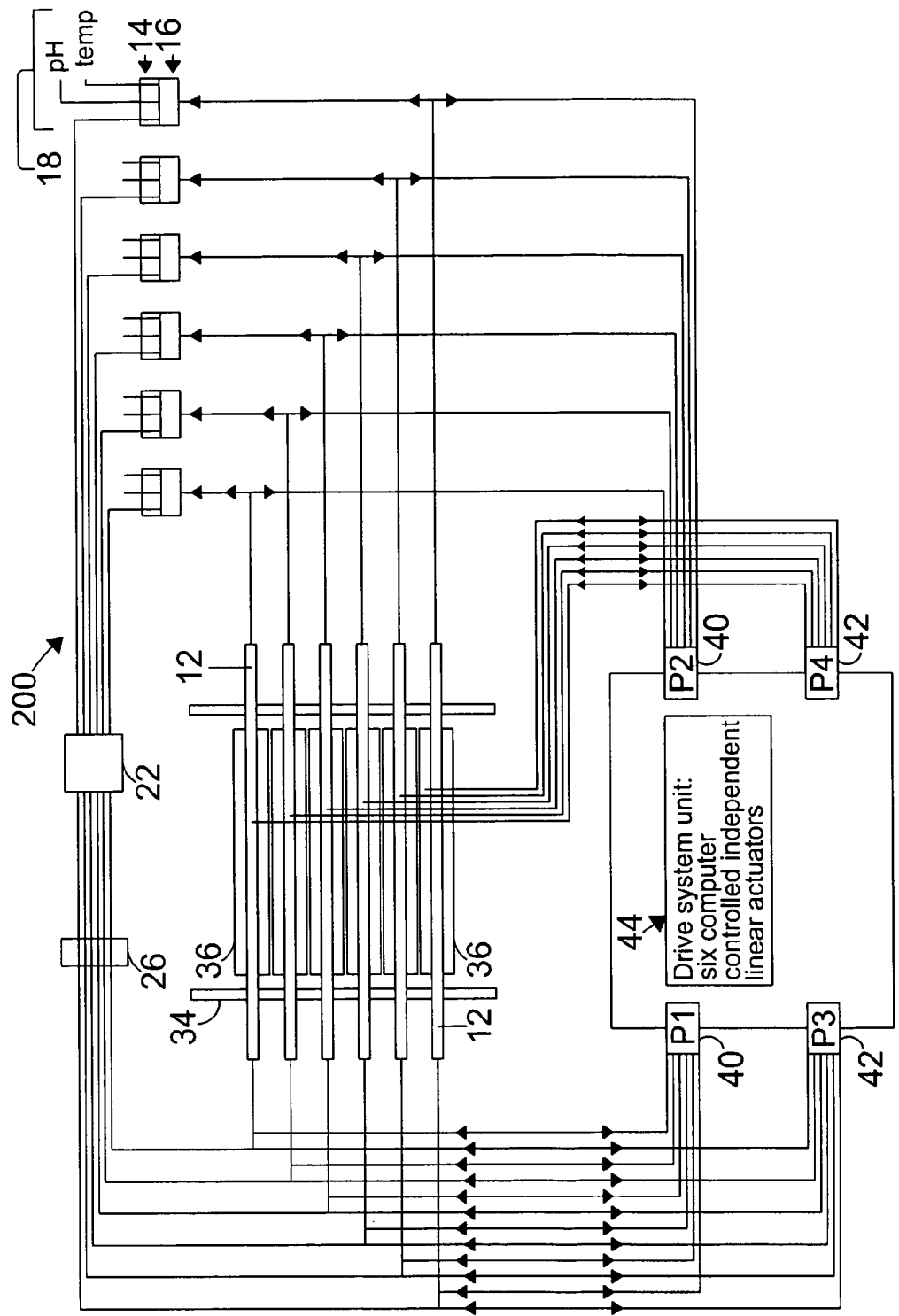

FIG. 10 is a schematic diagram of a second embodiment of the present invention.

DETAILED DESCRIPTION OF THE INVENTION.

Figure 1A:
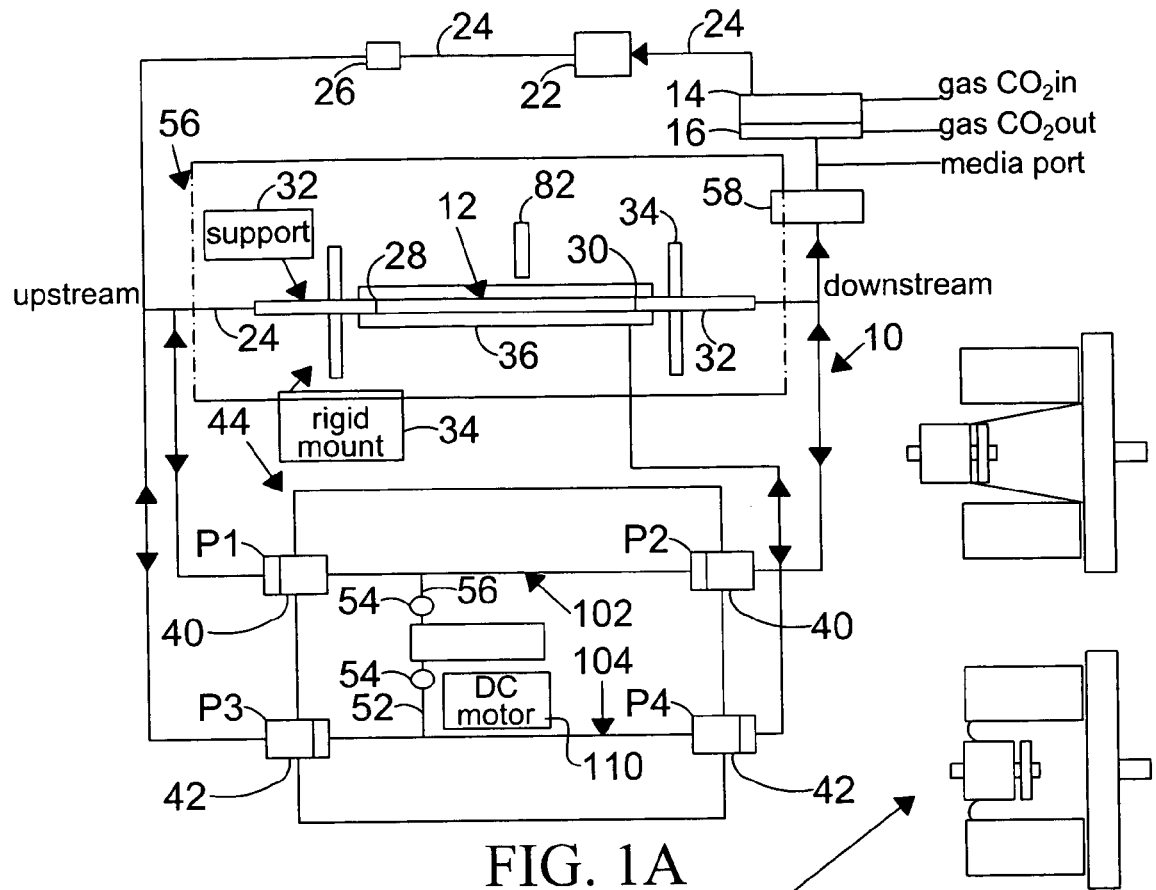
FIG. 1A is a top plan schematic view of the hemodynamics simulator of the present invention.
Figure 1B:
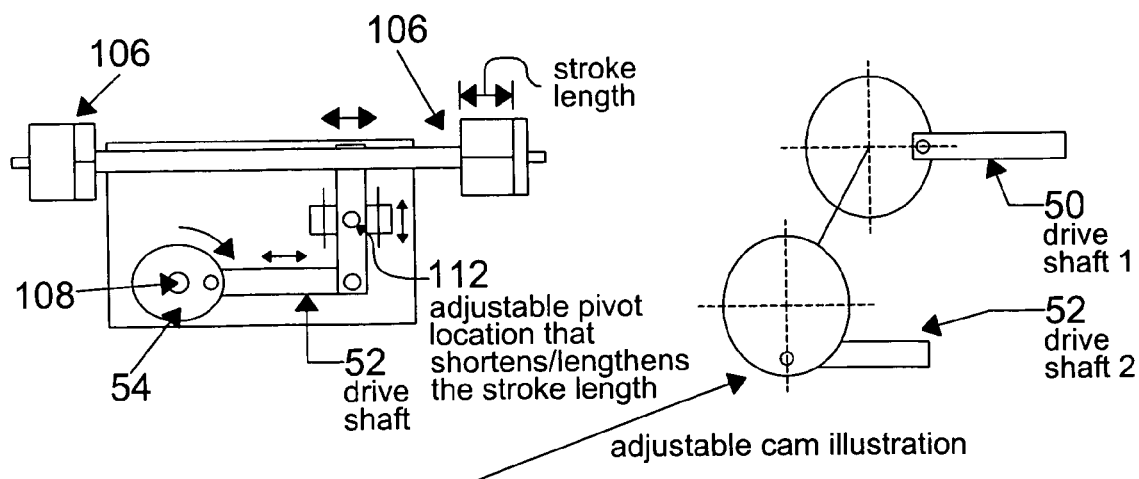
FIG. 1B is a side view illustrating the 4-bar linkage of the present invention.

The present invention is a hemodynamic simulator 10, shown schematically in FIG. 1A, and in greater detail in FIG. 1B. The hemodynamic simulator 10 comprises a sample chamber 12 (which will also be referred to herein as "compliant vessel") which may comprise either a non-rigid tube that contains mammalian cells, a blood vessel excised from a mammal, or other biocompatible substrate containing cells or onto which cells can be grown or attached thereto. Sample chamber 12 is connected to a reservoir 14 containing an appropriate fluid 16, which may comprise a tissue culture medium, blood or a blood analog fluid, physiological saline solution (generally a solution of 0.9% sodium chloride (("NaCl")), as known to those skilled in the art), or other buffered solution.

Reservoir 14 generally is a sterilizable container comprising a plurality of fittings 20 which function to provide, for example only and not intended as any limitation except as described in the claims, temperature probe insertion; pH probe insertion; inflow and outflow of culture medium 16; inflow and outflow of one or more gases, such as, but not limited to, $CO_2$, nitrogen, oxygen, air or other gas or gaseous mixture, such as 5% $CO_2$ in air; as may be required; media sampling port; addition of acid, base or other buffering agent for the adjustment or other control of medium pH. Reservoir 14 is generally made of a standard laboratory grade glass, but, as known to those skilled in the art, may also comprise any type of sterilizable plastic vessel which can meet the system's requirements.

The system 10 includes a first pump 22, which is generally used to provide a steady flow of fluid 16 through the system, such that fluid 16 flows between reservoir 14 and compliant vessel 12 through tubing 24. In one embodiment of the present invention, the flow rate is maintained as a steady rate, controlled by first pump 22. In this embodiment, first pump 22 is a centrifugal pump, such as one the Biomedicus 520d (manufactured by Biomedicus Corp., Minneapolis, Minn.). In another embodiment of the present invention, first pump 22 is a peristaltic pump, such as that sold by MasterFlex Corp., New Brunswick Scientific (New Brunswick, N.J.) or other commercial laboratory supply manufacturers. Other types of pumps can also be employed as first pump 22, such as a DISC-FLO® pump, a gear pump, or other pumps which must provide a constant volumetric flow.

In the embodiment wherein the first pump 22 is a peristaltic pump, a noise filter 26 is required, in order to dampen the noise (high frequency vibrations) created by the movements of the peristaltic pump (FIG. 1B). The noise filter may also be referred to herein as a pulse damper, and is commercially available from laboratory supply houses, such as the PULSE DAMPENER® (Cole-Parmer Corp., Vernon Hills, Ill.). The noise filter 26 also serves as a bubble trap, preventing the passage of bubbles that may be generated by the pump. As will be described in further detail below, the system may also include a bypass to prevent bubbles from entering the compliant vessel (see FIG. 1C).

An alternate embodiment of the noise filter 26 is illustrated in FIG. 9, the differences between the noise filter in FIGS. 9A and 9B being the configuration of the container 72. Container 72 comprises a inlet 74 and outlet 76 ports for the inflow and outflow of fluid 16 from the system, respectively. Air inlet 78 and outlet 80 ports are also fitted into the container. In addition, a pressure relief valve (not shown) can be fitted into container 72. The alternate embodiments of the noise filter reduce the amount of fluid required by the system, compared to the amount of fluid used when the commercial noise filter is employed.

Generally, it is preferred to utilize a minimal amount of fluid 16 in order to reduce the costs of media utilization, drug treatment, and cell by-product (such as, but not limited to, proteins, metabolites and like) detection and the like. In the embodiment shown in FIGS. 1A–1C, approximately 100 ml of fluid are employed. The length of the tubing from the vibration damper 26 to the upstream connector also provides additional high frequency steady flow pump induced vibration damping.

Tubing 24 generally comprises any suitable type of laboratory tubing which is capable of being sterilized. Such tubing includes that sold under the trademark of Tygon® (Norton Co., Worcester, Mass.); PharMed® tubing (Trademark of PharMed Group Corporation, Miami, Fla.), silicone tubing, or other comparable laboratory or medical-surgical tubing from other manufacturers.

The length of the upstream tubing is chosen so as to minimize the total volume of fluid used in the system. Its length is calculated to provide a maximum flow rate, and to avoid turbulence in the system, based upon boundary layer theory, as known to those skilled in the art, and described further below.

Figures 6, 7:
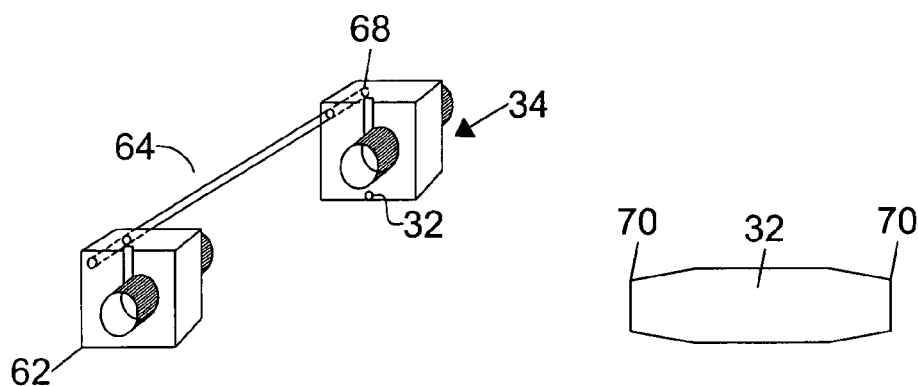
FIG. 6 illustrates the structure of the support and support mount.
FIG. 7 illustrates the shape of the support rod.
Figures 8A, 8B:
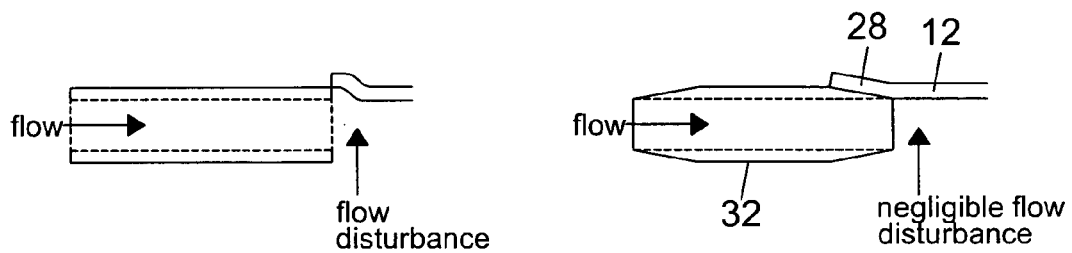
FIG. 8a and b illustrates fluid flow through the support rod and vessel using different shaped support rods. The arrow in Panels A and B represents the direction of fluid flow.

The compliant vessel 12 is supported proximate its ends 28, 30 by a pair of supports 32 which are held in place by a pair of rigid mounts 34, respectively. The mounts 34 and supports 32 preferably are as shown in FIGS. 6-8, each mount including an opening 62 therethrough, to accommodate a support 32 therein. To facilitate the alignment of the compliant vessel 12 within the support system, a support rod 64 is inserted into aperture 66 located on each support mount 62. A set screw 68 may be used to retain the support rod 64 in position. The support mount 34 preferably is made from a non-corrosive, durable material, and capable of withstanding autoclaving; stainless steel is one such material. Each support 32 comprises a tube having ends 70 shaped to fit the ends 28, 30 of compliant vessel 12 (FIGS. 8A and 8B). As shown in FIG. 8B, the tapered end 70 of support 32 provides a fit at the ends of compliant vessel 12 such that there is a negligible disturbance of fluid flow, in contrast to the disturbance that would occur if the end of support was linear (FIG. 8A). The ends of the compliant vessel 12 are attached to each support using clamps, suturing, or other methods known to those skilled in the art. In one embodiment of the present invention, the supports 32 are manufactured from TEFLON® (polytetrafluoroethylene, DuPont Co., Wilmington, Del.) or stainless steel, but other suitable, biocompatible materials can be substituted.

Depending upon the which properties (WSS, CS, pressure) are to be studied, the compliant vessel 12 may be surrounded by an external chamber 36, but external chamber is not required under all circumstances. In such instances, the external chamber is opened to the atmosphere. External chamber 36 is a sealed chamber that has a port with which the chamber can be filled with a fluid such as water or other fluid, and a second port through which contents of the chamber 36 can be pressurized by connection to one of the pumps 42. External chamber 36 may also be a jacketed chamber, enabling a cooled or heated fluid to circulate around the compliant vessel 12 in order to maintain the temperature required by the contents of the compliant vessel 12, and the chamber connected to a circulating bath, such as those manufactured by the Neslab Corporation.

Figure 1C:
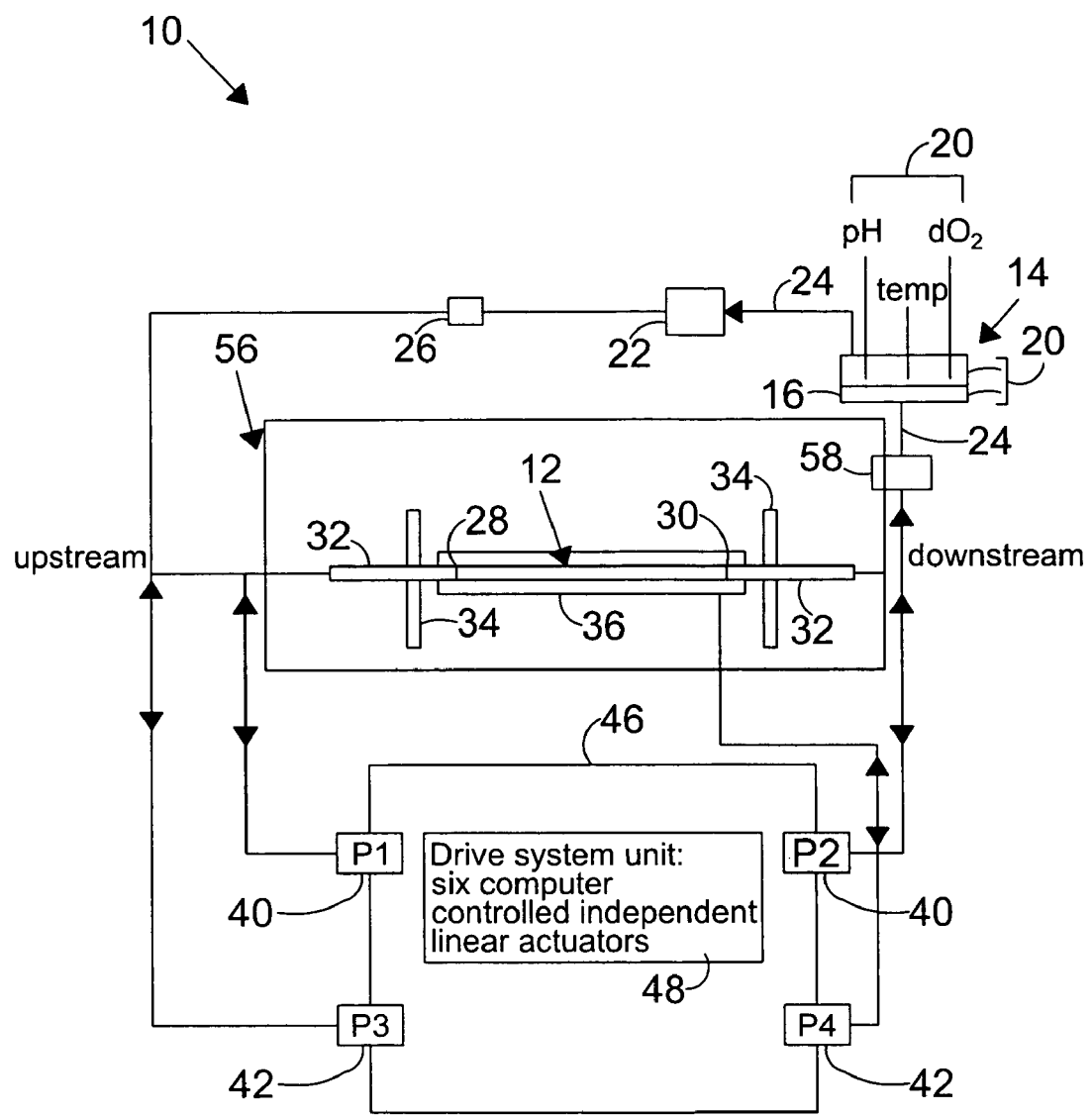
FIG. 1C is a more detailed schematic diagram of the embodiment of FIG. 1A.
Figure 1D:
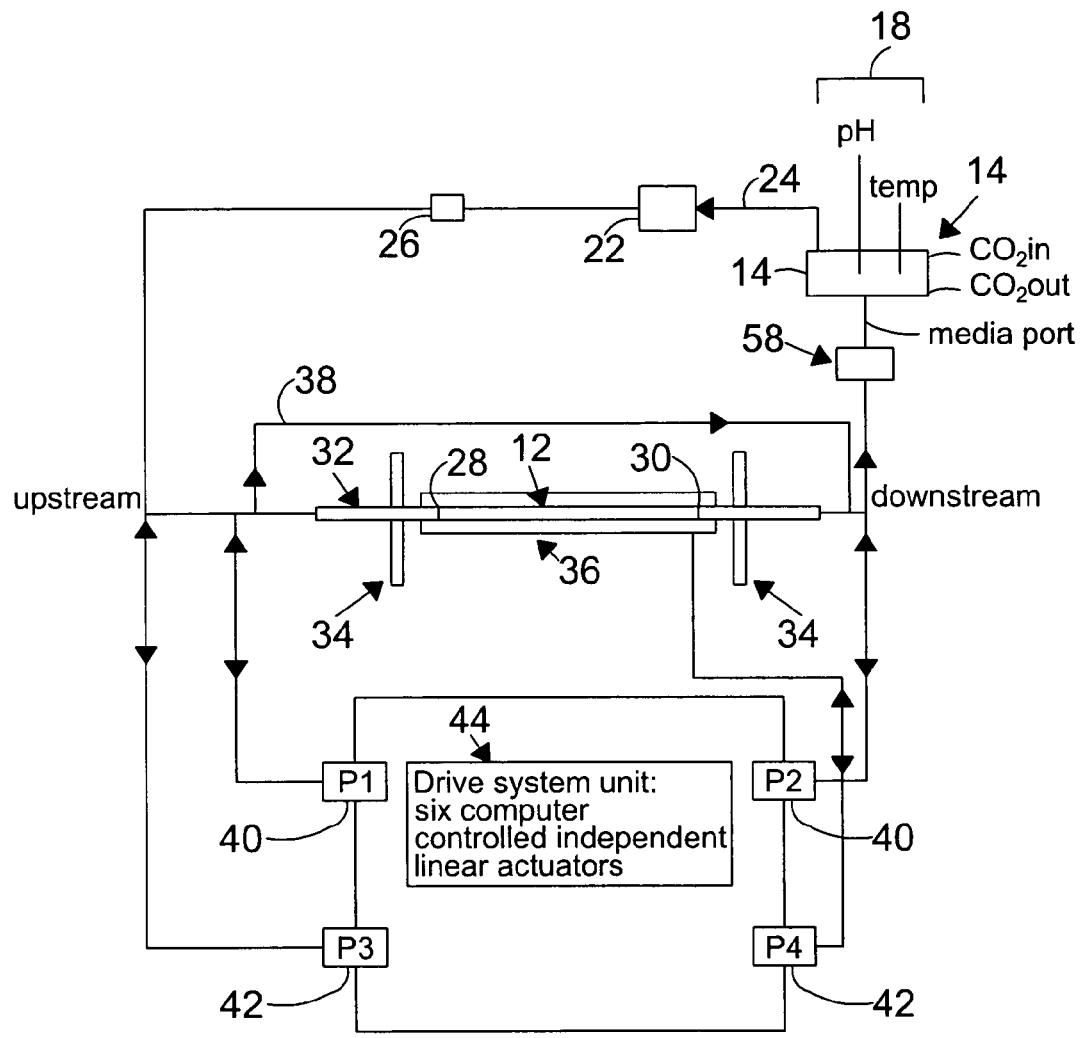
FIG. 1D is a schematic diagram of an embodiment which includes a bypass of the compliant vessel.

Although not essential to the operation of the hemodynamic simulator 10 of the present invention, an additional length of tubing 24 can be added to function as a compliant vessel bypass 38 (FIG. 1C). The bypass tubing 38 is connected both upstream and downstream of the compliant vessel 12, so that if problems occur when the system is started from a zero flow rate and pressure to the desired flow and pressure, such as bubble formation, the bypass can be used until proper conditions are achieved, at which point the bypass 38 is closed off or removed, and flow is resumed through the compliant vessel 12.

The support 32 is made from tubing having an inner diameter (I.D.) that matches the I.D. of both the compliant vessel 12 and the upstream tubing. By having the I.D. of the support matching the I.D. of the vessel and tubing, this prevents flow separation and an underdeveloped flow regime from occurring. The wall of the support 32 should taper to the outside such that the compliant vessel 12's I.D. does not bend abruptly as it is placed over the support. This provides a flush I.D. surface between the support 32 and the compliant vessel 12 and greatly minimizes flow separation. One possible configuration is to have the upstream tubing, the support 32 and the compliant vessel 12 to be made of one piece with a rigid structure around the upstream end and support.

Drive System

The system further comprises a plurality of pumps 40 and 42, further designated as second pumps 40 (also referred to herein as P1 and P2), and third pumps 42 (also referred to herein as P3 and P4), respectively (FIGS. 1A and 1B). As shown in FIG. 1A, pumps P1 and P3 are connected to the "upstream" flow of the hemodynamic system 10 of the present invention, pump P2 is connected to the "downstream" flow, and pump P4 is connected to the external chamber 36, providing external pressure on the compliant vessel 12 contained therein. Fluid 16 or the like flows downstream back into reservoir 14, in a closed flow system; the culture fluid is recycled to conserve culture fluid, but if the culture fluid becomes unsuitable for growth, such as caused by acid build-up therein, reservoir 14 can be replaced with one containing a fresh quantity of fluid 16, as appropriate. The various components of the present invention are connected by sterile fittings, and components can be changed, aseptically, as experimental or other conditions so require.

Each of pumps 40 and 42 is under the control of a drive system unit 44, which comprises a plurality of independent linear actuators 46. These actuators 46 can be individual, stand alone units, for may be controlled by one or more computer systems 48. In the embodiment in FIG. 1A, the second pumps 40 are connected by a shaft 50, and the third pumps 42 are connected by a second shaft 52. In one embodiment of the present invention, in which a 4-bar linkage mechanism is the drive system, a cam 54 affects the control of the various second pumps 40 and third pumps 42. In one embodiment of the present invention (FIG. 1B) the drive system unit 44 comprises six computer-controlled linear actuators, while in another embodiment (FIG. 1A) the drive system unit 44 comprises four independent computer-controlled linear actuators.

The hemodynamic simulator 10 includes a plurality of sensors 18 for measuring hemodynamic parameters. These sensors 18 include a flow sensor, which may be placed either upstream and/or downstream of the compliant vessel 12. Such a flow sensor can be an ultrasound Doppler probe, as known to those skilled in the art. The Doppler probe, depending upon its position in the system, can either be a sterile probe, and/or a probe that may or may not be fluid-contacting. An electromagnetic probe may also be used as a flow sensor. In one embodiment of the present invention, the flow sensor is an ultrasonic flow meter (Transonics Systems, Inc.) which is positioned in-line and just upstream of the compliant vessel. Flow rate variation over the length of the compliant vessel has been negligible.

A pressure sensor 18 is used for monitoring the internal system pressure, and positioned either upstream and/or downstream of the compliant vessel 12. A pressure sensor can also be placed in the external chamber 36 to monitor external chamber pressure. Pressure sensor 18 can also be a blood pressure catheter (such as, for example, and not intended as a limitation, a MILLAR catheter (MPC-500 with pressure meter TCB500; Registered Trademark of Millar Instruments Corp., Houston Tex.), in either a fluid contacting or non-contacting version. Pressure sensor 18 may also be a pressure probe, such as those known to those skilled in the art. In one embodiment of the present invention, the pressure sensor is a catheter tip transducer (Millar) which is inserted upstream into the lumen of the compliant vessel. Where cells are being used in the compliant vessel 12, the pressure sensor 18 is kept upstream to avoid damaging the cells. Pressure drop across the compliant vessel has been shown to be negligible.

The linear actuators 46 may be selected from among those that comprise a cam mechanism; a multi-bar linkage mechanism, such as an actuator comprising a four-bar mechanism; a solenoid; a stepper motor; an electric motor, whether operated by alternating current ("AC") or direct current ("DC"); a linear ball actuator; a belt driven actuator; a chain driven actuator; or any other drive unit which is capable of producing a variable cyclic motion, or any combination of the above actuators, such as, for example only, and not intended to be a limitation, the combination of a cam mechanism and a 4-bar linkage mechanism and a DC motor. The cyclic motion generated by the drive system unit can resemble that of a blood pressure waveform in its magnitude, frequency and other properties, as known to those skilled in the art. By adjustment of the drive system components, as known to those skilled in the art, the extent of the phase differences among the second pumps 38 (P1–P4) can be adjusted, from anywhere between 0 degrees and 360 degrees.

It has been classically known to those skilled in the art that pressure and flow are coupled, and could not be uncoupled. Using the dynamic sinusoidal environment created by the hemodynamics simulator 10 of the present invention, flow and pressure can be uncoupled.

This uncoupling is achieved using the drive system 44 of the present invention, comprising two reciprocating drive shafts 50 and 52 that are coupled via a circular cam 54 (FIG. 1A). Each flow shaft 50 or 52 drives two piston pumps P1 and P2, or P3 and P4, respectively (at opposite ends) that are 180 degrees out-of-phase and are connected to the recirculating flow loop upstream and downstream of the compliant vessel 12 (test section). The flow shaft allows independent control of pulsatile flow with no pulsatile circumferential strain. The second (pressure) shaft 52 also drives two piston pumps that are 180 degrees out-of-phase; however, one piston drives the internal pressure upstream to the compliant vessel 12 (test section) and the other piston drives the external chamber pressure. The pressure shaft allows for independent control of the pulsatile pressure. The attachment points of the circular cam 54 that couples the two drive shafts can be adjusted to provide the phase (between 0 and 360 degrees) between the motions of the two shafts. This phase difference provides simulation of a wide range of SPAs, including the disease prone coronary arteries (approximately 250 degrees). Since the flow is related to wall shear stress (WSS) and the pressure is related to the circumferential strain (CS), the pulsatile WSS and pulsatile CS are independent and uncoupled. In this process, changes in the upstream pressure may have an effect on the downstream pressure, such that if the stroke of the upstream pumped is changed, the stroke of the downstream pump does require compensation.

Prior to setting up the hemodynamic simulator 10 of the present invention, system components are sterilized. Sterilization can be effected, depending upon the components of the system, by methods such as autoclaving, ethylene oxide (EtO) treatment, ultraviolet light irradiation, gamma irradiation, and other methods known to those skilled in the art.

The hemodynamic simulator 10 is generally run at a temperature of approximately 37 degrees Centigrade, but it can be operated at temperatures ranging from approximately 20 degrees Centrigrade to approximately 50 degrees Centigrade. As shown in FIG. 1B, the "test section", representing the compliant vessel 12, and support means 32 and 34 can be immersed in a water bath 56 of the appropriate temperature. The hemodynamic simulator 10 can be operated for a duration ranging from as short as a few minutes, for example, 5–10 minutes, to more extended lengths of time, such as, between approximately 72 hours to 168 hours. In a preferred situation, the hemodynamic simulator is operated over a period of between approximately 5 hours and approximately 72 hours. A limiting factor in the duration of the hemodynamic simulator 10's operation is maintenance of sterility of the system.

It is to be understood that factors such as the geometry of the vessel, the diameter of the vessel, the viscosity of the medium used, the pressure, and the flow rate of the medium through the vessel, are among the factors that determine the wall shear stress (WSS), and that when reference is made to WSS, these factors are taken into consideration.

By insertion of the compliant vessel 12 within the external chamber 36, the effects of diameter variation, caused by circumferential strain and wall shear stress, can be studied, in the absence of pulsatile pressure (condition 2).

The diameter variation of the compliant vessel is measured using a diameter sensor. The diameter sensor can be a non-contacting ultrasound transducer 82 (such as a single element transducer V312 101.25 and pulser-receiver unit 5072, both from Panametrics Co., Waltham, Mass., not shown). The ultrasound probe position must be perpendicular to and aligned with the center of the diameter of the test specimen in order to sense the diameter. One beam passes through the specimen (a pulse), differences in material densities results in peaks and beam profile alterations that are detected with the receiver, and are subsequently acquired and processed using a computer which includes an oscilloscope with peak detection software and appropriate analytical software. A linear cross-sectional profile of the specimen is then detected, providing the dimensions of the outer and inner walls, and consequently, wall thickness. The probe can be positioned anywhere in the test section to provide dimensions. Absolute and relative dimensions can be obtained, for example, relative dimensions are sufficient for monitoring diameter variations. The dimensions are monitored and acquired, via the computer, in real-time along with pressure, flow and other measurements. A multi-array ultrasound probe can also be used to monitor diameter variation. The diameter sensor can also utilize lasers, video imaging, magnetic resonance imaging, other imaging modalities, or can be a contacting probe, such as known to those skilled in the art.

All data signals are acquired by the computer system, which is not shown in the drawings. The ultrasound diameter monitoring requires a peak detection algorithm. Phase angle is determined using Fast Fourier Transforms ("FFT"). Some signals are used for monitoring, and feedback control such as mean pressure, is monitored and adjusted via a motor controlled downstream reactor.

The wall shear stress waveform is determined based on the measured flow waveform and the mean diameter according to Womersley (1955, and incorporated hereinby reference).

Initially, the flow is run at a low flow rate, and then the flow is adjusted to a high flow rate. The resistor 58 is adjusted to provide a mean pressure, and the oscillatory drive system unit 44 is engaged to oscillate the ends of the sample, depending upon the experimental conditions under investigation, by varying the movement of second pumps 40, (P1 and P2) and third pumps 42 (P3 and P4). The resistor 58 is a device that controls the degree of occlusion of the downstream flow to achieve a desired mean pressure. Examples of resistors suitable for use in the present invention include a gear motor controlled clamp device that controls occlusion of the downstream tubing; valves, pinch clamps or other types of laboratory clamps.

The hemodynamic simulator 10 of the present invention can simulate the important features of the mammalian hemodynamic environment, The first hemodynamic conditions to be discussed are the fluid flow, pressure, and diameter variation (circumferential strain). The fluid flow and pressure (and consequently diameter variation) can be manipulated to allow for precise control of the cyclic pulsatile fluid flow and pressure magnitude and phase. The fluid flow and pressure, and consequently, the diameter variation in the case of tubular geometry, can be manipulated to allow for precise control of the cyclic pulsatile fluid flow and pressure magnitude and phase. A "tubular geometry case", as used herein, is intended to refer to the use of curved vessels (for example, half a toroid), bifurcated vessels (including variation such as branched, Y-shaped, T-shaped, and the like). In other instances, the vessels employed are linear and non-branched.

There are several possible system configurations available, depending upon the simulation conditions.

Complete control of the fluid flow and pressure relations attainable are:
  Condition 1-fluid flow and pressure magnitude and phase (0–180 degrees) [i.e., wall shear stress 10 dynes per square centimeter +/-10 dynes per square centimeter and 8% diameter variation with their phase variation (angle) at 180 degrees for a compliant vessel 12 made of silicone;
  Condition 2-pulsatile flow and no pulsatile pressure (diameter variation), magnitude and phase;
  Condition 3-pulsatile pressure (diameter variation) and no pulsatile flow magnitude and phase; and
  Condition 4-pulsatile flow and pulsatile pressure (no diameter variation) magnitude and phase.

In a compliant vessel where the transmural flux (hydraulic conductivity and/or permeability) can be monitored, conditions 1 and 2 require no change or considerations. Condition 3 requires consideration of the potential transmural reflux due to active transmural pressure modulation. Condition 4 requires consideration of potential external pressure augmentation due to increased hydraulic conductivity and/or permeability that can be compensated for via an external pressure feedback control mechanism.

Under Condition 1, the following combinations of second pumps 40 (P1 and P2), and third pumps 42 (P3 and P4) can be utilized: a) all four pumps, P1, P2, P3 and P4; b) P1, P2 and P4; or c) P1 and P3; or d) P2 and P4.

Under Condition 2, second control pumps 40, P1 and P2 are utilized.

Under Condition 3, third pumps 42, P3 and P4 are utilized.

Under Condition 4, second pumps 40 (P1 and P2) and third pumps 42 (P3 and P4) are utilized.

The conditions are chosen according to the desired hemodynamic environment under simulation. Condition 1 is the most physiologically prevalent condition. The upstream, downstream, and external pressures are modulated, primarily, with respect to amplitude, phase, and frequency to achieve the desired hemodynamic environment. These parameters are effected using the controls of the drive system unit, a laboratory computer system 48.

The system thus operates with one of the second pumps 40 (in this instance, pump P1) affecting the upstream portion of the compliant vessel 12, and exerting its actions in a "pushing" manner along the compliant vessel 12. A similar action is obtained with the third pump 42 (pump P3) acting on the upstream end of compliant vessel. In contrast, the other of the second pumps 40 (in this instance, pump P3) affects the downstream portion of the compliant vessel 12. Third pump P4 exerts an external pressure on the compliant vessel 12. The different actions of the pumps affect the movement/pulsation of the compliant vessel 12.

The effects of wall shear stress (WSS) are studied when the upstream second pump P1 and the downstream third pump P3 are engaged. In this situation, these pumps are working against each other by being 180 degrees out of phase, and the upstream pump P1 causes an increase in the flow rate, while the downstream pump P3 causes a decrease in flow rate, resulting in no external pressure, and a combination of shear stress and pulsatile fluid flow through the compliant vessel 12.

When the hemodynamic simulator 10 of the present invention is used for studying the effects of circumferential strain (CS) on the compliant vessel 12, one second pump, P1 and third pump P4, are used. In this situation, the first pump 22 (the steady flow pump) can be shut off, and second pump P1 provides the upstream pressure, while third pump P4 provides the external pressure on the compliant vessel 12.

The novel part of the apparatus is the drive system which induces the sinusoidal flow component and the diameter variation. In one embodiment of the present invention, the drive system 44 is a 4-bar linkage mechanism, shown schematically (FIG. 1). The second pumps 40 (P1 and P2) are connected by a first linkage 102. Third pumps 42 (P3 and P4) are connected by a second linkage 104. Each linkage connects to piston 106 of each pump. The linkages are connected to cams 54 by shafts 50 and 52, and each cam 54 is connected at 108 to a DC motor 110. Each drive shaft 52, 54, is connected by an adjustable pivot 112, which adjusts the length of the stroke of each pumps' piston 106. The drive system comprises two reciprocating drive shafts which are coupled through a circular cam. The phase between the motion of the two shafts can be varied by adjusting the angle between the attachment points of the two shafts on the common cam 54 (for example, zero degrees for in-phase, 180 degrees for out-of-phase). One of the shafts 50 drives two piston pumps which are 180 degrees out-of-phase and are connected to the recirculating flow loop upstream and downstream of the compliant vessel 12. The second shaft 52 drives two piston pumps which are also 180 degrees out-of-phase; one pump feeds the flow loop upstream of the compliant vessel, the second pump drives the external chamber. The two out-of-phase piston pumps driving the internal flow loop act in a push-pull fashion. When the external chamber 36 is open to the atmosphere (when the second drive shaft 52 is disconnected) and the stroke volumes of the push-pull pumps on the first drive shaft are equal, a sinusoidal flow is generated, but with negligible pressure variation because of the push-pull action. When the system is run in this fashion (second shaft disconnected) it is possible to ave sinusoidal flow (superimposed on the steady flow) with negligible pressure or diameter variation. To induce diameter variation, the second shaft is connected at any desired phase relative to the first shaft by adjustment of the cam 54. When both piston pumps on this shaft are interfaced to this system, it is possible to adjust their stroke volumes so that the pressure in the external chamber and in the elastic compliant vessel are nearly constant (as a result of the push-pull action), and there is diameter variation driven by the volume change between the elastic compliant vessel and the external chamber (one fills while the other empties). When the system is run in this fashion, there is sinusoidal flow with defined diameter variation and phase angle relative to flow, but there is negligible pressure variation. This enables the present invention to uncouple pressure and stretch.

To introduce pressure variation in phase with diameter variation, which is considered to be the most physiological condition, the drive line to the external chamber is disconnected, and the chamber is left open to the atmosphere. In this mode of operation, both pressure and diameter variation are driven by the upstream piston pump P3 on the second shaft 50. Some interaction occurs between the pumps driven on the two shafts, but the volume flows driven by the second shaft 50 (controlling diameter variation) are very small compared to those driven by the first shaft 52 (which controls flow), and they can be adjusted nearly independently.

The present invention was designed to overcome the current technological limitations in vascular research by physically simulating the normal and diseased physiologic states. The present invention achieves a precise and complete physiologic environment by uncoupling the major hemodynamic forces, WSS and CS, thereby permitting independent control over the magnitude and phase of the pulsatile WSS and CS to achieve a wide range of SPA. The present invention experimentally simulates real hemodynamic patterns, both simple and complex patterns, while maintaining sterility of the system, and employing a minimal volume of media demanded by cell and tissue culture systems.

The advantage of cell and tissue culture systems is that the tools of cell and molecular biology are easily employed. This integrative approach to the design of the present invention resulted in a system that is quick and easy to assemble and disassemble while maintaining the cell culture integrity that is important for biological assays. The test chamber of the present invention facilitates the insertion and removal of the test specimens. The test specimens are generally endothelial cell coated silicone elastic tubes which are placed in the hemodynamic simulator of the present invention, and yield biological results relevant to the normal and diseased cardiovascular system.

Those skilled in the art have classically considered it well known that pressure and flow are coupled. However in the dynamic sinusoidal environment, established by the invention, flow and pressure can be uncoupled, thereby providing independent control over WSS and CS.

The present invention not only provides a means for studying hemodynamics in normal and diseased states, but it also can be used in tissue engineering, to test or train the function of bypass vessels prior to their use in coronary bypass surgery, or to investigate cryopreserved vessels for research or medical use. Current coronary bypass surgery most often utilizes vessels from the hemodynamically unstrenuous saphenous vein (in the lower leg) as the bypass vessel. The present invention can be used to train the vessel to the strenuous hemodynamic environment of the coronary arteries. As can be seen from the foregoing, these applications are ultimately related to the treatment of cardiovascular disease.

The present invention may also be useful for analysis of bone mechanics, and effects of flow and related parameters on the development of osteocytes, chondrocytes and the like. Shear stress is known to increase the production of types II and I collagen, and other extracellular products, thus potentiating the fact that further mechanical stimuli, such as strain and shear stress, would further improve production of extracellular products. Stem cells can be stimulated to differentiate by mechanical stimuli, such as shear stress, strain, or solute transport systems. Other applications include, but are not intended to be limited to, effects on cell and tissue culture, tissue engineering, effects in complex artery geometries, effects on cardiac valves and their in vitro evaluation, evaluation and standardization of imagery diagnostic methods using vascular phantoms, effects of pharmacological agents on cells and tissues, materials testing in standard environments and in microgravity environments, and on cells co-cultured in a mixed bioreactor.

EXAMPLE 1

Preparation of Silicone Tubing for Attachment and Growth of Endothelial Cells

In this example, the vessel chosen for growth of endothelial cells is a silicone tubing, sold by Dow-Corning, Midland, Mich. under the brand name of SYLGARD 184 elastomer, or Silastic (MDX4-4210), Medical Grade tubing, and used to prepare elastic artery models. These models were prepared using the method described by Lee and Tarbell (1997, and hereby incorporated by reference), and included the preparation of models of human linear and bifurcating arteries.

For the preparation of linear elastic vessels, a pair of symmetric, half-cylindrical grooved molds made of a plastic, such as PLEXIGLASS, are machined to have a diameter that matches the inner diameter of the elastic model described above. In one preferred embodiment, the linear elastic vessels have a length of approximately 29 centimeters and an inner diameter of approximately 0.79 centimeters, in another embodiment of the present invention, vessels having a length of approximately 15 cm are employed. A solid wax, cylindrical core is prepared by distributing melted wax (CARBOWAX®, Union Carbide Co.) into the mold, and placing the mold inside another cylindrical mold of the same plastic; in the preferred embodiment, this second mold has a diameter of approximately 0.95 centimeters, so as to produce an annular layer having a diameter of approximately 0.080 centimeters. A solution of SYLGARD 184® and a curing agent, prepared in accordance to methods known to those skilled in the art, is poured into this part of the mold, vacuum deaerated by methods known to those skilled in the art, and then cured. After curing, the elastic vessel is removed from the mold.

The elastic vessels are treated to promote cell attachment before being inoculated with cells. Briefly, the vessels are hydrophyllized in a 70% sulfuric acid solution, boiled in distilled water and then sterilized by autoclaving. The vessels are then coated with a layer of fibronectin (30 micrograms/ml in Modified Eagle's Medium (("MEM")), a tissue culture medium known to those skilled in the art, fibronectin is obtained from commercial sources).

While vessels having inner diameters ranging from between 1–10 mm can be used, vessels having an inner diameter of approximately 8 mm (0.79) cm has been shown to be an optimal inner diameter, and allow for the use of multiple tubes in the present invention while keeping the overall size of the present invention, and the consumption of cell culture media and other expendibles, within a range that is manipulable by laboratory personnel. In the system shown in FIGS. 1A–1C, approximately 100 ml of fluid are employed. Each end of the vessel is inserted into position in the present invention as has been previously described, using the supports 32 and mounts 34. Where necessary, sterile tubing connectors are also employed to enable tubing and other components to be connected into the system under aseptic conditions.

EXAMPLE 2

Tissue Culture Conditions

Endothelial cells ("ECs") were obtained either from bovine aortas ("BAECs"), or from human umbilical veins ("HUVECs"), and cultured by growth as primary cultures, using procedures described in Sill et al. (1995). the contents of which is hereby incorporated by reference.

The BAECs were the cells most commonly used with the present invention. An inoculum of between 60,000–80,000 cells per square centimeter is used twice, once to enable the cells to adhere to the surface of the vessel for a 45 minute time period, and a second time after rotating the position of the vessel 180 degrees to enable the vessel's other side to become coated. The cells are grown in a monolayer until confluency is achieved, in a 37 degree centrigrade tissue culture incubator in an atmosphere of 5% $CO_2$ in air. The preferred growth medium 16 is Dulbecco's Modified Eagle's Medium ("DMEM", obtained commercially from Sigma Chemical Corp., St. Louis, Mo.), containing 10% Fetal Bovine Serum ("FBS", obtained commercially), 1% L-glutamine and 1% antibiotics (penicillin-streptomycin solution. For experiments, the medium comprised DMEM without FBS, and 1% bovine serum albumen ("BSA") and 1% antibiotics (penicillin-streptomycin solution; BSA and the antibiotics are commercially available from Sigma Chemical Corp.). MEM (also obtained from Sigma) may be employed, depending upon the type of cells being utilized. Generally, the pH of the culture fluid is maintained at approximately pH 7.2, +/−0.05, but a pH in the range between approximately 7.0 to approximately 7.5 is acceptable.

Requirements of the fluid 16 include having a viscosity that can be elevated to achieve conditions of physiologic stress at modest flow rates. Dextran is used within the fluid while the present invention uses vessels of approximately 0.79 cm diameter; in instances employing vessels of smaller diameter, addition of dextran is not necessary. The fluid should be free of Phenol Red and serum so as not to interfere with measurements of other cellular products, such as prostacycline or nitric oxide. Serum and other substances can be added to the media if these substances are under study, or if the serum or substance is required by the cell line.

In addition to the use of tissue culture media, other physiological fluids, such as blood from a mammal such as sheep, cow, pig, rabbit, or human cord blood or human blood, can be utilized. Artificial or analog blood fluids can also be used. Among the blood analog fluids known to those skilled in the art is an admixture of glycerol in water, and adjusted to have a viscosity comparable to blood.

EXAMPLE 3

Effect of Different Stress Phase Angles: Zero Degree SPA

Figure 2:
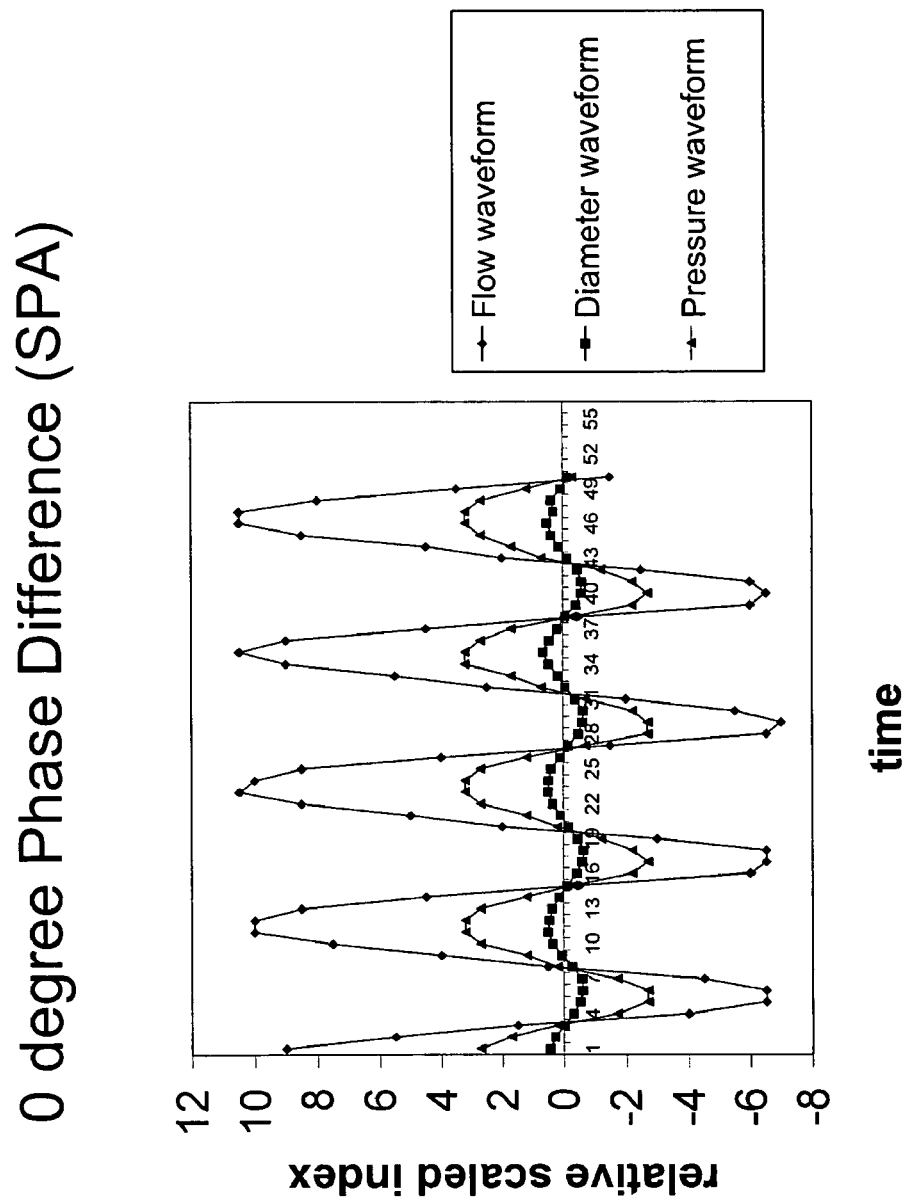
FIG. 2 is a plot of the diameter (circles) and pressure (triangles) waveforms as a function of time with a zero degree stress phase angle (SPA) difference.

FIG. 2 is a plot of the diameter (circles) and pressure (triangles) waveforms as a function of time with a zero degree stress phase angle (SPA) difference.

Changes in the diameter of the compliant vessel 12 can be measured by one of several methods known to those skilled in the art. These include the use of such non-contacting methods as ultrasound or laser light, or the use of an elastic strain gauge, which is in physical contact with the specimen (the compliant vessel). In the present invention, the preferred method of monitoring the changes in compliant vessel diameter is with an ultrasound transducer (Panametrics Co., not shown) which is mounted through the exterior chamber wall and which is focused on the compliant vessel.

The computer controlled drive unit 44 is capable of generating different waveforms, which can range from a sine wave, as employed in this and the subsequent examples (FIGS.2–6), or which can be a blood pressure waveform, such as a known waveform taken from a reference text, or determined experimentally on a human. For convenience in establishing the parameters of the present invention, sine waves were chosen. The flow waveform represents the rate of flow of the culture medium 16 or other fluid through the system as a function of time. The flow rates, in milliliters per minute, have been normalized so as to fit on a scale ranging from plus 1 to minus 1. Similarly, data representing the pressure on the compliant vessel 12, expressed in mm of mercury, and the degree of distortion of the diameter of the compliant vessel (diameter waveform) have also been so normalized.

The rate of wall shear in the compliant vessel was measured using a photochromic method of flow visualization for use in elastic tubes. Using a focused laser beam having a specific wavelength, the laser beam passes through the vessel, containing a photo-sensitive dye of a corresponding wavelength, and causes the dye to change color and generate a dye line within the fluid flow. Using a video camera to record the displacement of the dye line caused by the pulsating laser beam, the near wall velocity profile form which the wall shear rate can be determined from the slope at the wall, using methods described in Rhee and Tarbell (1994, and incorporated by reference herein). In this example, the preferred laser is a nitrogen laser with a wavelength in the range of the ultraviolet (VSL337ND, from Laser Science Inc.).

A polyalkylene glycol ether, described in Weston et al. (1996, and incorporated by reference herein) would be usable because this agent has the Theological properties comparable to blood, and the photodynamic properties that are compatible with the material from which the compliant vessels were manufactured.

FIG. 2 illustrates that when there is no difference in the phase angle between the flow and the pressure, the pressure waveform and the diameter waveform are similar to each other.

EXAMPLE 4

Effect of Different Stress Phase Angles: Sixty Degree SPA

Figure 3:
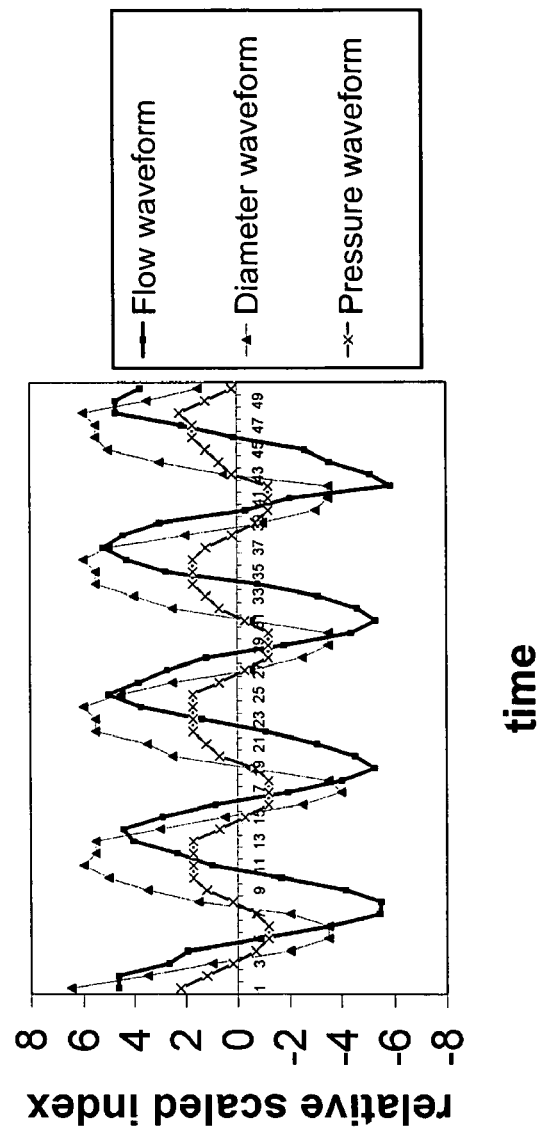
FIG. 3 is a plot of the diameter (triangles), pressure (crosses) and flow (squares) waveforms as a function of time with a sixty degree stress phase angle (SPA) difference.

FIG. 3 is a plot of the diameter (triangles), pressure (crosses) and flow (squares) waveforms as a function of time with a sixty degree stress phase angle (SPA) difference.

When the phase angle between the flow and the pressure are sixty degrees out of phase, the pressure waveform and the diameter waveform remain similar to each other, while the flow waveform is shifted (FIG. 3).

EXAMPLE 5

Effect of Different Stress Phase Angles: Ninety Degree SPA

Figure 4:
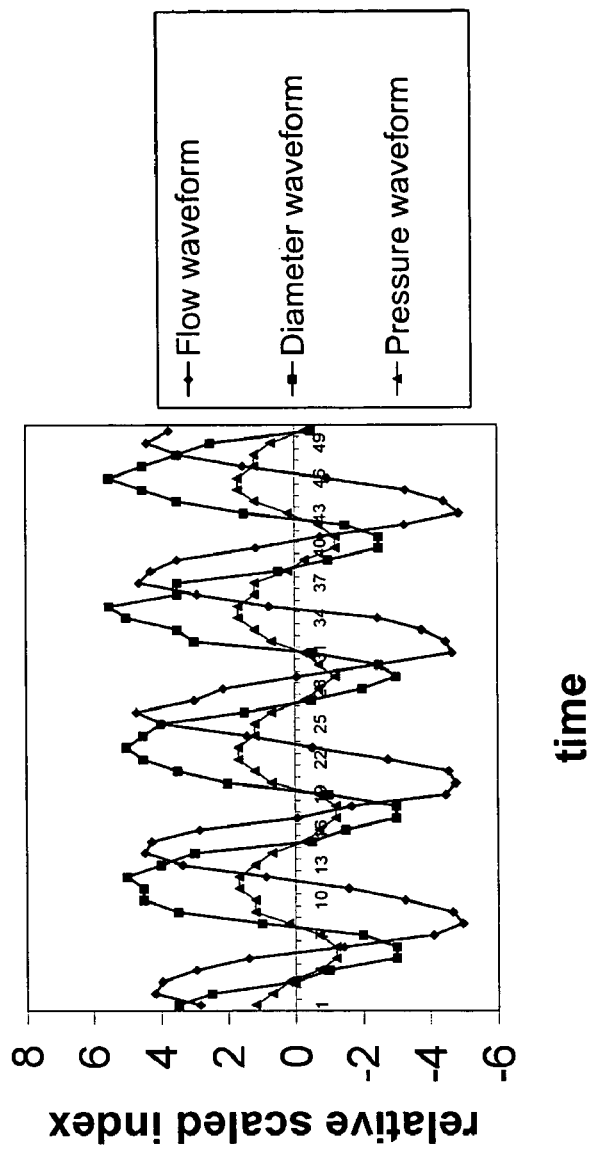
FIG. 4 is a plot of the diameter (squares), pressure (triangles) and flow (diamonds) waveforms as a function of time with a ninety degree stress phase angle (SPA) difference.

FIG. 4 is a plot of the diameter (squares), pressure (triangles) and flow (diamonds) waveforms as a function of time with a ninety degree stress phase angle (SPA) difference.

When the phase angle between the flow and the pressure are ninety degrees out of phase, the pressure waveform and the diameter waveform remain similar to each other, while the flow waveform is shifted (FIG. 4).

EXAMPLE 6

Effect of Different Stress Phase Angles: One Hundred Eighty Degree SPA

Figure 5:
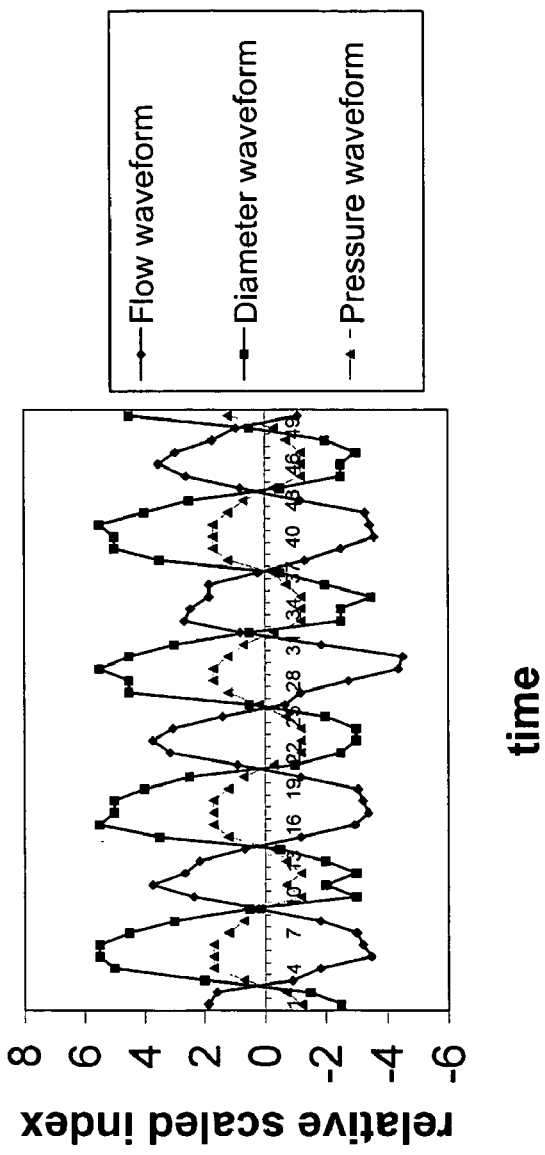
FIG. 5 is a plot of the diameter (squares), pressure (triangles) and flow (diamonds) waveforms as a function of time with a one hundred eighty degree stress phase angle (SPA) difference.

FIG. 5 is a plot of the diameter (squares), pressure (triangles) and flow (diamonds) waveforms as a function of time with a one hundred eighty degree stress phase angle (SPA) difference.

When the phase angle between the flow and the pressure are one hundred eighty degrees out of phase, the pressure waveform and the diameter waveform remain similar to each other, but the flow waveform is shifted to an even greater extent compared to when they are either 60, or 90 ninety degrees out of phase (compare FIG. 5 with FIGS. 2–4).

EXAMPLE 7

Compliant Vessels

Example 1 described the use of vessel models, modeled after the structure and material properties of actual human aortic vessels. In addition to using models of vessels, other vessels can be used in conjunction with the present invention. These can be chosen from the group consisting of an artery, an artificial artery, a vein, human umbilical tissue, or a nonrigid tube. The artery may comprise a bovine aorta, or a human coronary artery. The vein may comprise bovine veins, or human veins such as a human leg vein or a human umbilical vein. Bovine tissue can be obtained from commercial supply sources, such as Vec Technologies, Ithaca N.Y. and human umbilical materials can be obtained a local hospital, or a commercial sources such as Clonetics, Vec Technologies, or other sources known to those skilled in the art. In addition to studying the effects of hemodynamic conditions on endothelial cells, other types of cells can also be used, including smooth muscle cells, cartilage cells, osteocytes, embryonic and adult stem cells, and the like.

The tubing employed as the vessel can have any geometry, ranging from geometries, such as, for example only and not intended as any limitation, straight, curved, bifurcating, branched or the like. The vessel may also be chosen from any chamber, whether having a parallel flow, a radial flow, etc. The vessel may also be made of any material, such as, but not limited to, materials such as silicone, collagen, an artery, a vein, glass, tissue culture grade plastics or the like; such materials are considered to be biocompliant. The compliant vessel can thus have any combination of these properties.

EXAMPLE 8

An Embodiment for Studying Hemodynamics on Multiple Vessels

In this embodiment of the present invention (shown schematically in FIG. 10, and in which like reference numerals refer to like elements), the hemodynamics simulator 200 can be used to study hemodynamic properties of a plurality of compliant vessels 12. This embodiment is similar to that described in FIGS. 1A and 1B, but comprises a plurality of compliant vessels 12, a plurality of reservoirs 14, a first pump 22 which has been adapted to pump fluid through a plurality of tubing 24, and a plurality of noise filters 26, as needed, as has been described for that embodiment (FIG. 1B). The compliant vessels 12 are enclosed in a plurality of external chambers 36. Under such conditions, compliant vessels 12 can be studied with and/or without an external chamber 34 under otherwise comparable experimental conditions. The drive system unit 44 is similar to that described previously (FIGS. 1A–1B). Although a plurality of reservoirs 14 are illustrated in FIG. 10, a single reservoir could be used to supply all of the compliant vessels 12, or multiple reservoirs containing different types of culture media or other biological fluid 16, could be used, for examining the effects of either different cell types under identical stress conditions, or the effects of different fluids on a cell line, or other combinations desired to be examined by one skilled in the art.

Therefore, although this invention has been described with a certain degree of particularity, it is to be understood that the present disclosure has been made only by way of illustration and that numerous changes in the details of construction and arrangement of parts may be resorted to without departing from the spirit and scope of the invention.

REFERENCES

Berthiaume, F., Frangos, J. A. 1993. "Flow effects on endothelial cell signal transduction, function and mediator release." Flow-dependent regulation of vascular function. Bevan et al., Oxford Univ. Press, New York.

Carosi, C. G., Eskin, S. G., and McIntire, L., 1992. Cyclic strain effects on production of vasoactive materials in cultured endothelial cells. J. Cellular Physiol. 151:29–36.

Lee, C. S., and Tarbell, J. M. 1997. Wall shear rate distribution in an abdominal aortic bifurcation model: Effects of vessel compliance and phase angle between pressure and flow waveforms. J. Biomech. Engr. 119:333–342.

Rhee, K., and Tarbell, J. M. 1994. A study of the wall shear rate distribution near the end-to-end anastomosis of a rigid graft and a compliant artery. J. Biomechanics 27:329–338.

Qiu, Y. C., and Tarbell, J. M. 2000. Interaction between wall shear stress and circumferential strain affects endothelial cell biochemical production. J. Vascular Res. 37:147–157.

Seliktar, D., Nerem, R. M. et al. 2000. Dynamic mechanical conditioning of collagen gel blood vessel constructs induces remodeling in vitro. Ann. Biomedical Eng. 28:351–362.

Sampio, B. E., and Widmann, M. D. 1990. Enhanced production of endothelial-derived contracting factor by endothelial cells subjected to pulsatile stretch. Surgery 108:277–282.

Weston, M. W., Rhee, K., and Tarbell, J. M. 1996. Compliance and diameter mismatch affect the wall shearrate distribution near an end-to-end anastomosis. J. Biomechanics 29:187–198.

Womersley J. R. 1955. Method for the calculation of velocity, rate of flow and viscous drag in arteries when the pressure gradient is known. J. Physiol. 127:553–563.

All patents and references cited herein are hereby incorporated by reference in their entirety.

We claim:

1. A system for hemodynamic simulation, the system comprising:
    a fluid;
    a vessel through which the fluid may be urged;
    a chamber in which the vessel is received, the chamber including a means for controlling pressure;
    a reservoir for retaining the fluid;
    a plurality of pumps in fluid communication with the fluid, one of the pumps urging the fluid through the vessel; and
    a means for controlling the pumps, wherein the means for controlling the pumps comprises a motor, a cam, and a means for linking the pumps, wherein the pumps are operatively connected to the means for controlling the pumps.

2. The system as described in claim 1, wherein the means for linking the pumps is adjustable, and wherein the pumps are out of phase with each other.

3. The system as described in claim 2, wherein the pumps are out of phase with each other by between 10 and 360 degrees.

4. The system as described in claim 3, wherein the pumps are out of phase with each other by between 90 and 180 degrees.

5. A system for hemodynamic simulation, the system comprising:
    a vessel through which the fluid may be urged;
    a chamber in which the vessel is received, the chamber including a means for controlling pressure;
    a reservoir for retaining the fluid;
    a plurality of pumps in fluid communication with the fluid, one of the pumps urging the fluid through the vessel; and
    a means for controlling the pumps, wherein the means for controlling the pumps is selected from the group consisting of a cam mechanism; a multi-bar linkage mechanism; a solenoid; a stepper motor; an electric motor; a linear ball actuator; a belt-driven actuator; and a chain-driven actuator.

6. The system as described in claim 1, further comprising a third pump, the third pump being connected to the chamber, and wherein when the means for controlling pressure is applied to the chamber, pressure is exerted on the vessel.

7. The system as described in claim 6, further comprising a means for adjusting the downstream flow of the fluid between the vessel and the reservoir.

8. The system as described in claim 7, further comprising a steady flow pump, the steady flow pump being positioned between the reservoir and one of the pumps.

9. The system as described in claim 8, further comprising a means for filtering noise, the means for filtering noise being positioned between the steady flow pump and the vessel.

10. The system as described in claim 5, wherein the means for controlling the pumps further comprises a computer system.

11. The system as described in claim 1, wherein the vessel is chosen from the group consisting of mammalian blood vessels; models of mammalian blood vessels; endothelial cells; osteocytes; chondrocytes; and muscle cells.

12. The system as described in claim 1, wherein the plurality of pumps comprises:
    an upstream pump in fluid communication with the fluid, the upstream pump urging the fluid through the vessel in a pushing manner; and
    a downstream pump in fluid communication with the fluid, the downstream pump being downstream of said upstream pump, the downstream pump urging the fluid through the vessel in a pulling manner.

13. The system as described in claim 1, wherein the plurality of pumps comprises:
    a pair of upstream pumps in fluid communication with the fluid.

14. The system as described in claim 1, wherein the plurality of pumps comprises:
    an upstream pump in fluid communication with the fluid, the upstream pump urging the fluid through the vessel in a pushing manner; and
    an external pump, the external pump being operatively connected to the chamber, wherein when the means for controlling pressure is applied to the chamber, pressure is exerted on the vessel.

15. The system as described in claim 1, wherein the plurality of pumps comprises:
    a downstream pump in fluid communication with the fluid, the downstream pump urging the fluid through the vessel; and
    an external pump, the external pump being operatively connected to the chamber, wherein the means for controlling pressure is applied to the chamber, pressure is exerted on the vessel.

16. A system for hemodynamic simulation, the system comprising:
    a fluid;
    a vessel through which the fluid may be urged;
    a chamber in which the vessel is received, the chamber including a means for controlling pressure;
    a reservoir for retaining the fluid;
    a plurality of pumps in fluid communication with the fluid, one of the pumps urging the fluid through the vessel; and
    a means for controlling the pumps comprising a motor, a cam, and a means for linking the pumps with each other, the pumps being operatively connected with the means for controlling the pumps, the means for linking the pumps being adjustable, the pumps being out of phase with each other.

17. The system as described in claim 16, wherein the plurality of pumps comprise:
an upstream pump in fluid communication with the fluid, the upstream pump urging the fluid through the vessel in a pushing manner; and
a downstream pump in fluid communication with the fluid, the downstream pump being downstream of the upstream pump, the downstream pump urging the fluid through the vessel in a pulling manner;
a third pump operatively connected to the means for controlling the pumps, the third pump being connected to the chamber, and wherein when the means for controlling pressure is applied to the chamber, pressure is exerted on the vessel.

18. The system as described in claim 17, wherein the vessel is chosen from the group consisting of mammalian blood vessels; models of mammalian blood vessels; endothelial cells; osteocytes; chondrocytes; and muscle cells.

19. The system as described in claim 16, wherein the plurality of pumps comprise:
a pair of upstream pumps in fluid communication with the fluid.

20. The system as described in claim 16, wherein the plurality of pumps comprise:
an upstream pump in fluid communication with the fluid, the upstream pump urging the fluid through the vessel in a pushing manner; and
an external pump, the external pump being operatively connected to the chamber, wherein when the means for controlling pressure is applied to the chamber, pressure is exerted on the vessel.

21. The system as described in claim 16, wherein the plurality of pumps comprise:
a downstream pump in fluid communication with the fluid; the downstream pump urging the fluid through the vessel in a pulling manner;
an external pump, the external pump being operatively connected to the chamber, wherein when the means for controlling pressure is applied to the chamber, pressure is exerted on the vessel.

22. A method for simulating biomechanical stimuli, the method comprising the steps of:
providing a fluid;
providing a vessel through which the fluid may be urged;
providing a chamber for receiving the vessel therein, the chamber further including a means for controlling pressure, wherein said chamber is connected to a pump;
providing an upstream pump in fluid communication with the fluid, the upstream pump urging the fluid through the vessel in a pushing manner;
providing a downstream pump in fluid communication with the fluid, the downstream pump urging the fluid through the vessel in a pulling manner.

23. The method as described in claim 22, further comprising the step of applying the means for controlling pressure to the chamber, thereby exerting pressure on the vessel.

24. The method as described in claim 22, wherein the vessel is chosen from the group consisting of mammalian blood vessels; models of mammalian blood vessels; endothelial cells; osteocytes; chondrocytes; and muscle cells.

25. The method as described in claim 23, further comprising the step of providing a means for controlling the pumps, wherein the upstream pump and the downstream pump are operatively connected with the means for controlling the pumps.

26. The method as described in claim 25, wherein the means for controlling the pumps comprises a motor, a cam, and a means for linking the upstream pump with the downstream pump.

27. The method as described in claim 26, wherein the means for linking the upstream pump and the downstream pump is adjustable, and wherein the upstream pump and the downstream pump are out of phase with each other.

28. The method as described in claim 27, wherein the upstream pump and the downstream pump are out of phase with each other by between 10 and 360 degrees.

29. The method as described in claim 28, wherein the upstream pump and the downstream pump are out of phase with each other by between 90 and 180 degrees.

30. The method as described in claim 25, wherein the means for controlling the pumps is selected from the group consisting of a cam mechanism, a multi-bar linkage mechanism; a solenoid; a stepper motor; an electric motor; a linear ball actuator; a belt-driven actuator; and a chain driven actuator.

31. The method as described in claim 30, further comprising the step of providing a reservoir for retaining the fluid, the reservoir being in fluid communication with the vessel.

32. The method as described in claim 31, further comprising the step of providing a means for adjusting the downstream flow of the fluid between the vessel and the reservoir.

33. The method as described in claim 32, further comprising the step of providing a steady flow pump, the steady flow pump being positioned between the reservoir and the upstream pump.

34. The method as described in claim 33, further comprising the step of providing a means for filtering noise, the means for filtering noise being positioned between the steady flow pump and the vessel.

35. The method as described in claim 34, wherein the means for controlling the pumps further comprises a computer system.

36. The method as described in claim 22, wherein the biomechanical stimuli are chosen from the group consisting of wall shear stress, circumferential strain, pulsatile pressure, transmural pressure, and biologically active agents.

37. A method for hemodynamic simulation, the method comprising the steps of:
providing a fluid;
providing a vessel through which the fluid may be urged;
providing a chamber in which the vessel is received, the chamber further including a means for controlling pressure;
providing a reservoir for retaining the fluid;
providing a plurality of pumps in fluid communication with the fluid, wherein one of said pumps urges the fluid through the vessel; and
providing a means for controlling the pumps, comprising a motor, a cam, and a means for linking the pumps with each other, the pumps being operatively connected with the means for controlling the pumps, the means for linking the pumps being adjustable, the pumps being out of phase with each other.

38. The system described in claim 37, wherein the vessel is chosen from the group consisting of mammalian blood vessels, models of mammalian blood vessels; endothelial cells; osteocytes; chondrocytes; and muscle cells.

39. The method as described in claim 37, further comprising:
  providing an upstream pump in fluid communication with the fluid; the upstream pump urging the fluid through the vessel in a pushing manner; and
  providing a downstream pump in fluid communication with the fluid, the downstream pump being downstream of the upstream pump, the downstream pump urging the fluid through the vessel in a pulling manner; and
  providing a third pump, the third pump operatively connected to the means for controlling the pumps, the third pump being connected to the chamber, and wherein when the means for controlling the pressure is applied to the chamber, pressure is exerted on the vessel.

40. The method as described in claim 37, further comprising:
  providing a pair of upstream pumps in fluid communication with the fluid.

41. The method as described in claim 37, further comprising:
  providing an upstream pump in fluid communication with the fluid, the upstream pump urging the fluid through the vessel in a pushing manner; and
  providing an external pump the external pump being operatively connected to the chamber, wherein when the means for controlling pressure is applied to the chamber, pressure is exerted on the vessel.

42. The method as described in claim 37, further comprising:
  providing a downstream pump in fluid communication with the fluid, the downstream pump urging the fluid through the vessel in a pulling manner; and
  providing an external pump, the external pump being operatively connected to the chamber, wherein when the means for controlling pressure is applied to the chamber, pressure is exerted on the vessel.

43. The system of claim 1, wherein the fluid comprises tissue culture medium, blood, physiological saline solution, or other buffered solution.

44. The system of claim 16, wherein the fluid comprises tissue culture medium, blood, physiological saline solution, or other buffered solution.

45. The method of claim 22, wherein the fluid comprises tissue culture medium, blood, physiological saline solution, or other buffered solution.

46. A system for hemodynamic simulation, the system comprising:
  a vessel through which fluid may be urged;
  a chamber in which the vessel may be received, the chamber including a means for controlling pressure within the chamber and being connected to a pump;
  a reservoir suitable for retaining a fluid; and
  a plurality of pumps, one of said pumps being suitable for urging fluid through the vessel, wherein said pumps are operatively connected to the means for controlling the pumps, and wherein the means for controlling the pumps comprises a motor, a cam, and a means for linking the pumps.

* * * * *